United States Patent [19]

Payne, Jr.

[11] 4,415,180
[45] Nov. 15, 1983

[54] STROLLER LATCH

[75] Inventor: Rex E. Payne, Jr., Elverson, Pa.

[73] Assignee: Dawn Designs, Inc., Elverson, Pa.

[21] Appl. No.: 258,198

[22] Filed: Apr. 27, 1981

[51] Int. Cl.³ .............................................. B62B 7/08
[52] U.S. Cl. ..................... 280/650; 16/321; 16/333; 280/642; 292/128; 292/228
[58] Field of Search .............. 280/639, 642, 647, 648, 280/650, 655; 16/321, 333; 292/128, 228, 263

[56] References Cited

U.S. PATENT DOCUMENTS

| 2,419,790 | 4/1947 | Peltier | 280/642 |
| 3,184,261 | 5/1965 | Young | 296/26 |
| 3,187,373 | 6/1965 | Fisher | 16/324 |
| 3,627,342 | 12/1971 | Morellet | 280/649 |
| 3,918,734 | 11/1975 | Firth et al. | 280/650 |
| 4,126,331 | 11/1978 | Sloan et al. | 280/650 |
| 4,294,464 | 10/1981 | Ettridge | 280/650 |

FOREIGN PATENT DOCUMENTS

| B 20597 | 5/1956 | Fed. Rep. of Germany | 16/333 |
| 2529297 | 11/1976 | Fed. Rep. of Germany | 280/650 |
| 581467 | 11/1924 | France | 280/647 |
| 1281344 | 7/1972 | United Kingdom | 280/650 |

Primary Examiner—Joseph F. Peters, Jr.
Assistant Examiner—Kenneth R. Rice
Attorney, Agent, or Firm—Seidel, Gonda & Goldhammer

[57] ABSTRACT

First and second frame members on a stroller partially overlap one another and are generally parallel. A latch member is pivotably connected to the first frame member and biased to a position wherein it embraces an end of the second member. The latch member has a cam surface thereon so that finger pressures may be applied to pivot the latch frame member against the spring bias or so that the end of the second member may contact the surface and pivot the latch member whereby the second member will be snapped to a latched position without finger manipulation.

9 Claims, 5 Drawing Figures

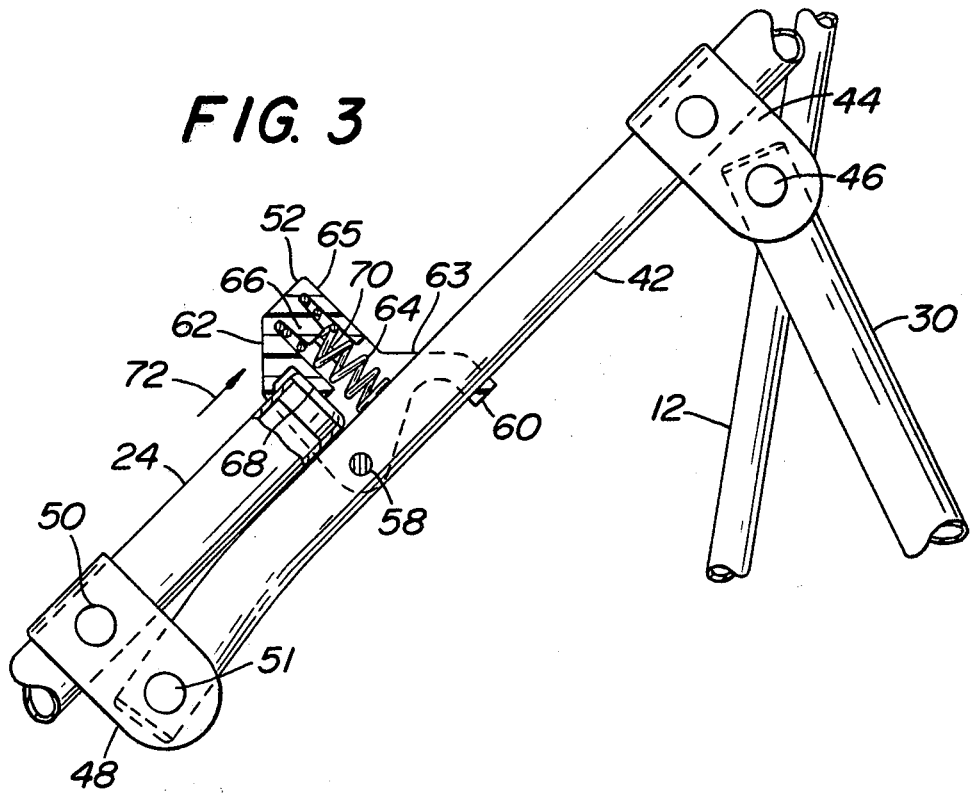
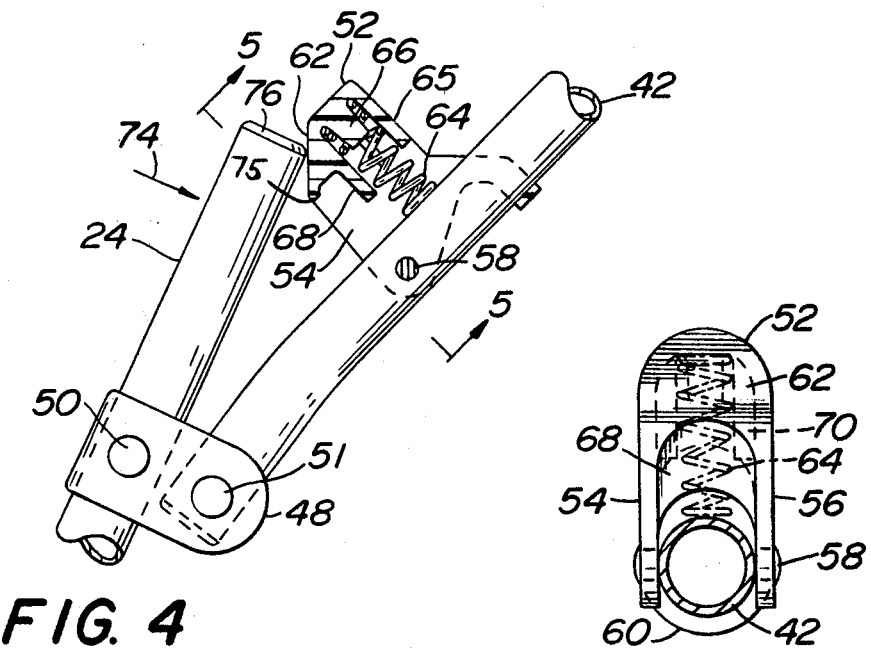

STROLLER LATCH

BACKGROUND OF THE INVENTION

A number of collapsible devices such as a baby stroller have need for a latch which retains the components in an asembled position, will permit collapsing of the frame components after finger manipulation of the latch member, but does not require any finger manipulation when the frame members are moved from a collapsed position to an assembled position. The present invention is directed to a solution to that problem whereby movement of frame members from a collapsed position to an assembled position is accomplished in a simple and facile manner as opposed to the prior art where the user feels that he needs three hands in order to assemble a collapsible device to an assembled position.

SUMMARY OF THE INVENTION

The present invention is directed to a latch which includes a latch member extending between first and second frame members. The frame members have end portions which overlap one another and which are generally parallel. The first frame member has one end pivotably connected to the second frame member at a location spaced from the adjacent end of the second frame member. The latch member is pivotably mounted on the first frame member and spring biased to a position wherein it embraces said adjacent end of the second frame member.

A first surface on said latch member is provided where finger pressure may be applied to release the latch member so that the first and second frame members may pivot relative to one another. Said surface is positioned on the latch member at a location so that the adjacent end of the second frame member may contact the same to pivot the latch member and then be snapped to a latched position without finger manipulation of the latch member.

In the preferred embodiment of the present invention, the frame members are part of a collapsible baby stroller. However, the latch of the present invention is adaptable for use on other devices having pivotably connected frame members.

The primary object of the present invention is to provide a latch which will facilitate one frame member to be snapped to a latched position with respect to another frame member without finger manipulation, but constructed in a manner so as to require finger manipulation to permit releasing the frame members.

It is another object of the present invention to provide a latch for a collapsible baby stroller whereby finger manipulation is not required in order to couple pivotably mounted frame members as they ar moved from a collapsed position to an operative position.

It is another object of the present invention to provide a novel latch for first and second collapsible frame members wherein the latch is simple, inexpensive, and reliable.

Other objects and advantages will appear hereinafter.

For the purpose of illustrating the invention, there is provided in the drawings a form which is presently preferred; it being understood, however, that this invention is not limited to the precise arrangements and instrumentalities shown.

FIG. 3 is a side elevation view of overlapping frame members in a latched position with the latch member in section.

FIG. 4 is a view similar to FIG. 3 but showing the frame members in an unlatched position with one frame member being moved towards its latched position.

FIG. 5 is a sectional view taken along the line 5—5 in FIG. 4.

DETAILED DESCRIPTION

Figure 1:
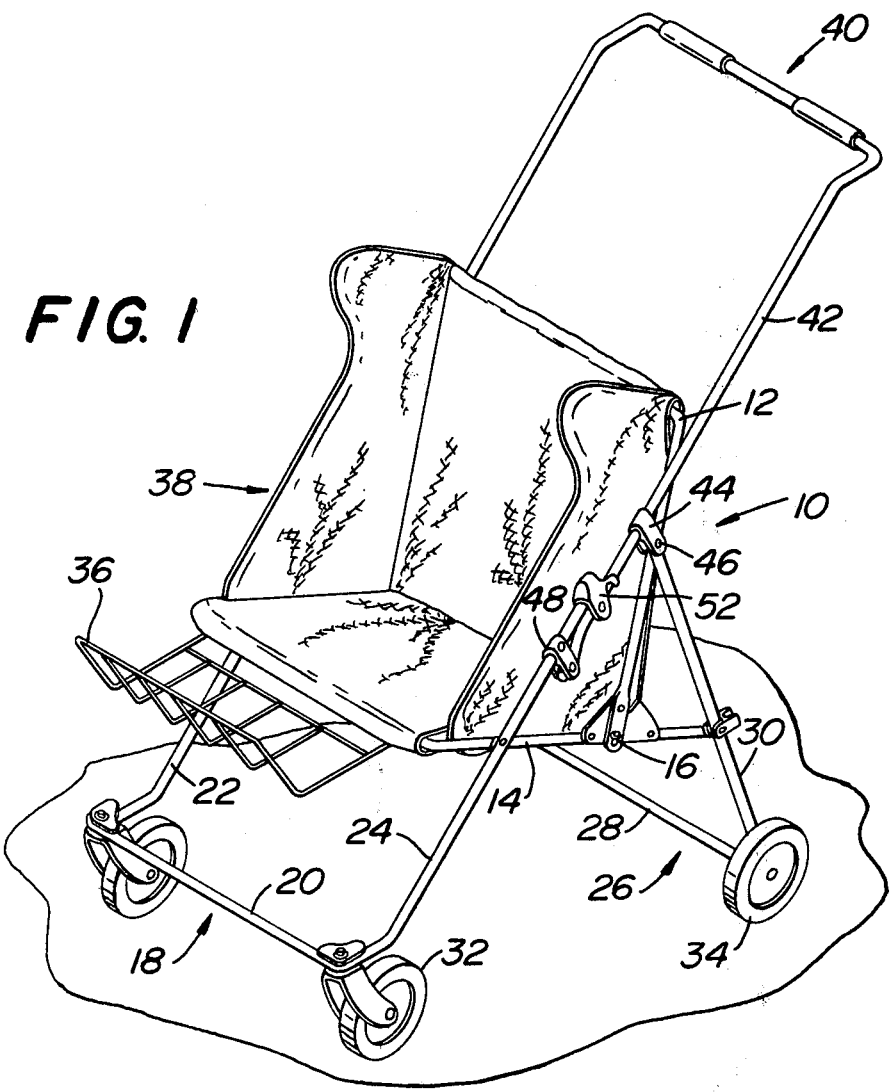
FIG. 1 is a perspective view of a collapsible baby stroller incorporating the present invention.

Referring to the drawing in detail, wherein like numerals indicate like elements, there is shown a collapsible baby stroller incorporating the latch of the present invention and designated generally as 10. The stroller 10 includes five U-shaped tubular frame members. The seat portion is defined by U-shaped frame members 12 and 14. The free ends of the frame member 12 are pivotably connected to the legs of frame member 14 intermediate the ends thereof for pivotable movement about the pin 16. A U-shaped frame member 18 has a bight portion 20 and legs 22, 24. Each of the legs 22, 24 is pivotably connected intermediate their ends to an intermediate portion of the legs on frame member 14.

A fourth U-shaped frame member is designated 26. Member 26 has a bight portion 28 and legs 30. The free ends of legs 30, only one of which is shown, are each pivotably connected to a U-shaped bracket 44 fixed to a leg 42 of the U-shaped frame member 40. Legs 30 and 42 pivot about pin 46. Front swivel wheels 32 are supported by the bight 20 while wheels 34 are supported by the bight 28. A seat 38 is attached to members 12 and 14. A leg support 36 is adjustably attached to member 14.

Figure 2:
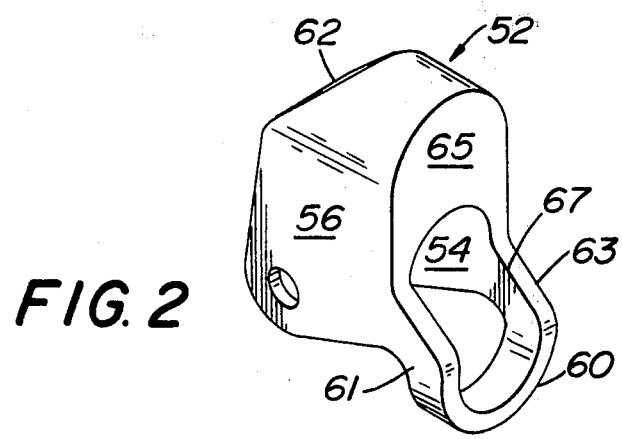
FIG. 2 is a perspective view of a latch member used in accordance with the present invention.

The U-shaped frame member 40 is the handle utilized for pushing the stroller 10. The free ends of the legs 42 are pivotably connected to the legs 22, 24. As shown more in FIG. 3, a free end of leg 42 is pivotably connected to leg 24 by way of a U-shaped bracket 48. Bracket 48 is fixedly secured to the leg 24 adjacent but spaced from the free end of leg 24 by way of pin 50. Bracket 48 and leg 24 are pivotably connected to the leg 42 by way of pin 51. A discrete latch 52 is provided for releasably connecting each leg 42 with the free end 76 of each leg 24. As shown more clearly in FIGS. 2-5, each latch 52 includes a pair of spaced legs 54, 56 pivotably connected to the leg 42 by way of a pin 58. A limit stop in the form of a loop 60 is connected to the leg 56 by a downwardly and rearwardly extending extension 61 and is connected to the leg 54 by a similar extension 63. The loop 60, extensions 61 and 63 cooperate with the rear wall 65 to define a hole 67 through which the leg 42 extends.

The body or bight of the latch 52 has a sloping cam surface 62 terminating at a lip 75 above and forwardly of a front wall 68. Wall 68 is recessed and parallel to the rear wall 65. Between the walls 65, 68 there is provided a coil spring 64 which biases the latch member 52 to the position shown in FIG. 3. The upper end of the spring 64 surrounds a spring seat 66. On opposite sides of the spring seat 66, and on the inner surface of the legs 54, 56, there may be provided inwardly extending reinforcing ribs 70 which restrict side movement of spring 64.

Leg 24 remains latched to the leg 42 as shown in FIG. 3 until finger pressure is applied in the direction of arrow 72 in FIG. 3. Such finger pressure pivots the latch member 52 about the pin 58 whereby leg 24 may pivot from the position shown in FIG. 3 to a completely collapsed position or to a partially collapsed position as shown in FIG. 4. When assembling the stroller 10 from a collapsed position, it is only necessary to pivot the legs 24 and 42. As leg 24 and its bracket 48 pivot in the direction of arrow 74 about pin 51, the end 76 of leg 24 contacts the cam surface 62. Such contact pivots the latch member 52 in a clockwise direction in FIG. 4 about pin 58 until end 76 snaps under the lip 75. The latch member 52 will then be spring biased to the position as shown in FIG. 3. It will be noted that no finger manipulation of member 52 was necessary in order to latch the legs 22 and 42.

The legs 24 and 42 will remain in a latched position as shown in FIG. 3 until finger pressure is applied in direction of arrow 72 to release the latch. Spring 64 is not fixed to either the latch member 52 or the leg 42 but rather is merely trapped between the walls 65, 68 and the ribs 70. In view of the above it should be clear that the latch for joining leg 24 to leg 42 is automatic since no finger manipulation is necessary other than pivoting leg 24 with one hand while holding leg 42 with the other hand.

The latch member 52 is preferably a one piece molded plastic member. The preferred plastic is nylon. There are no movable components on member 52 and nothing to preassemble. The limit stop loop 60 is preferably spaced from pin 58 by a distance equal to the distance between pin 58 and the center of cam surface 62. An imaginary line perpendicular to cam surface 62 will preferably pass through the loop 60. The thusly described spacing of loop 60 facilitates ease of molding and provides an attractive appearance. However, loop 60 could be closer to or farther way from pin 58 if desired.

Cam surface 62 is an angle of 45° with respect to the longitudinal axes of frame members 24, 42. Cam surface 62 and its lip 75 are directly above pin 58 so that an imaginary line therebetween is virtually perpendicular to the longitudinal axis of frame members 24 and 42 when assembled as shown in FIG. 3. This arrangement minimizes accidental collapsing of the stroller due to external forces on frame member 24 or 42.

The present invention may be embodied in other specific forms without departing from the spirit or essential attributes thereof and, accordingly, reference should be made to the appended claims, rather than to the foregoing specification, as indicating the scope of the invention.

I claim:

1. A latch comprising a latch member extending between first and second frame members whose end portions overlap one another and which are generally parallel, the first frame member having one end pivotably connected to the second frame member at a location spaced from and adjacent one end of the second frame member, the latch member being pivotably supported on the first frame member and spring biased to a position wherein it embraces said ene of the second frame member, a surface on said latch member where finger pressure may be applied to release the latch member so that said first and second frame members may pivot relative to one another, said surface being a cam surface so that said one end of said second frame member may contact said cam surface to pivot the latch member and then be snapped to a latched position without finger manipulation of the latch member, said latch member being generally U-shaped so as to have legs generally parallel to one another, a loop connected by extensions to said legs so as to define a hole through which the first frame member extends.

2. A latch in accordance with claim 1 wherein said frame members are at an acute angle with respect to the horizontal with the second frame member being above the first frame member along the overlapping end portions.

3. A latch in accordance with claim 1 wherein said first frame member is an angularly disposed leg of a U-shaped frame with the bight being a pushing handle of a stroller, said second frame member being a leg of a U-shaped frame whose bight is connected to front wheels of a stroller.

4. A latch in accordance with claim 1 wherein the spring is trapped between surfaces of the latch member without being physically attached to either the latch member or the first frame member.

5. A latch in accordance with claim 1 wherein said latch member loop is a limit stop spaced from the location wherein the latch member is pivoted to the first frame member by a distance corresponding approximately to the distance between the pivot and said cam surface.

6. A latch in accordance with claim 1 wherein said cam surface is positioned so that finger pressure applied in a direction generally perpendicular to the direction in which the spring bias on the latch member is directed will release the second frame member from retention by the latch member.

7. An article of manufacure for use in coupling first and second frame members together when said frame members partially overlap and are generally parallel comprising a generally U-shaped latch member having a front end and a rear end, said latch member having a pair of spaced legs, each leg having a hole for pivotably connecting the latch member to a frame member, said latch member having a limit stop extending from its rear end, a cam surface on said latch member, said latch member having a recess beneath said cam surface and open at its front end, said recess being between said cam surface and the axis of said holes, and a spring associated with said latch member for biasing said latch member to a position wherein the limit stop is adapted to contact a surface of a frame member.

8. An article in accordance with claim 7 wherein said spring is a coil spring located between said legs.

9. A latch comprising a latch member extending between first and second generally parallel tubular frame members whose end portions overlap one another in a manner so that their longitudinal axes lie in a common vertical plane, the first frame member having one end pivotably connected to the second frame member at a location spaced from and adjacent one end of the second frame member, the latch member being pivotably supported on the first frame member, a spring biasing said latch member to a position wherein its embraces said end of the second frame member, a surface on the latch member wherein finger pressure may be applied to release the latch member so that said first and second frame members may pivot relative to one another, said surface being a cam surface so that said one end of said second frame member may contact said cam surface to pivot the latch member and then be snapped to a latched position without finger manipulation of the latch member.

* * * * *